(12) United States Patent
Wang et al.

(10) Patent No.: US 10,236,729 B2
(45) Date of Patent: Mar. 19, 2019

(54) METHOD AND SYSTEM FOR REGULATING CONTACTLESS TRANSFORMER

(71) Applicant: ZTE Corporation, Shenzhen (CN)

(72) Inventors: Jing Wang, Shenzhen (CN); Yaoguang Gao, Shenzhen (CN); Jie Fan, Shenzhen (CN); Yong Luo, Shenzhen (CN); Jianping Zhou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 191 days.

(21) Appl. No.: 15/024,364

(22) PCT Filed: Jun. 18, 2014

(86) PCT No.: PCT/CN2014/080223
§ 371 (c)(1),
(2) Date: Mar. 24, 2016

(87) PCT Pub. No.: WO2015/043249
PCT Pub. Date: Apr. 2, 2015

(65) Prior Publication Data
US 2016/0226318 A1  Aug. 4, 2016

(30) Foreign Application Priority Data

Sep. 27, 2013  (CN) .......................... 2013 1 0451294

(51) Int. Cl.
*H02J 50/90* (2016.01)
*H02J 50/80* (2016.01)
(Continued)

(52) U.S. Cl.
CPC .............. *H02J 50/90* (2016.02); *H02J 5/005* (2013.01); *H02J 17/00* (2013.01); *H02J 50/10* (2016.02); *H02J 50/80* (2016.02)

(58) Field of Classification Search
CPC .. H02J 50/90; H02J 50/80; H02J 50/10; H02J 5/005; H02J 17/00
See application file for complete search history.

(56) References Cited

U.S. PATENT DOCUMENTS 9,559,550 B2 *  1/2017  Ichikawa ................ H02J 17/00
2010/0201313 A1 *  8/2010  Vorenkamp ............. H02J 17/00
                                                   320/108
(Continued)

FOREIGN PATENT DOCUMENTS

CN          1334638 A      2/2002
CN          2713659 Y      7/2005
(Continued)

OTHER PUBLICATIONS

Office Action of Japanese Application Serial No. 2016-516961, dated Mar. 13, 2017.
(Continued)

*Primary Examiner* — Jung Kim
(74) *Attorney, Agent, or Firm* — Banner & Witcoff, Ltd.

(57) ABSTRACT

Disclosed are a regulating method and system for a contactless transformer, applied to a regulating system including a contactless transformer and a detecting device (2), wherein the contactless transformer includes a transmitting end (11) and a receiving end (12), and the method includes: using the detecting device (2) to detect power transmission parameter information between a transmitting coil (111) and a receiving coil (121) of the contactless transformer, and a transmitting end controller (113) regulating operating parameters of a power transmitting end circuit (112) based on the power transmission parameter information; a receiving end controller (123) regulating operating parameters of a power receiving end circuit (122) based on the power transmission parameter information.

18 Claims, 5 Drawing Sheets

(51) Int. Cl.
*H02J 17/00* (2006.01)
*H02J 5/00* (2016.01)
*H02J 50/10* (2016.01)

(56) References Cited

U.S. PATENT DOCUMENTS

2012/0329405 A1   12/2012   Lee et al.
2013/0024059 A1   1/2013   Miller et al.

FOREIGN PATENT DOCUMENTS

| | | |
|---|---|---|
| CN | 101814749 A | 8/2010 |
| JP | 2012120288 A | 6/2012 |
| WO | 2012090612 A1 | 7/2012 |
| WO | 2012/111085 A1 | 8/2012 |
| WO | 2012165243 A1 | 12/2012 |
| WO | 2013002488 A1 | 1/2013 |
| WO | 2013042224 A1 | 3/2013 |
| WO | 2013062253 A1 | 5/2013 |

OTHER PUBLICATIONS

International Search Report of PCT/CN2014/080223, dated Sep. 30, 2014.
European Search Report of EP Application No. 14850051.5, dated Sep. 9, 2016.

\* cited by examiner

METHOD AND SYSTEM FOR REGULATING CONTACTLESS TRANSFORMER

TECHNICAL FIELD

The present document relates to the field of contactless transformers, and more particularly, to a regulating method and system for a contactless transformer.

BACKGROUND OF THE RELATED ART

The traditional power transmission method achieves power transmission through an electrical connector such as a plug-socket. This transmission method is simple, convenient, but is only suitable for small-current transmission scenarios. In large-current transmission scenarios, it requires working together with the arc-extinguishing method, and the conductor is exposed, which is unsafe. Multiple plugging may cause mechanical wear and loose contact and the electric power cannot be effectively transmitted. The contactless transformer separates its primary and secondary coils by a certain distance and achieves power transmission through the magnetic coupling. The wireless charging system technology uses the advantage of the contactless transformer to address the defect that the traditional wire directly contacts the supply power.

The air gap between the primary and secondary coils of a common transformer is close to zero, the power transferred from the primary coil to the secondary coil is calculated based on the turn ration of the primary coil to the secondary coil. While the air gap between the primary coil and the secondary coil of a contactless transformer is relatively large, and the air gap significantly affects the parameters of the contactless transformer, especially the leakage inductance and coupling system of the contactless transformer, and further affects power transmission of the contactless transformer. For different air gap sizes, the contactless transformer needs to use different parameter settings.

Similarly, in the wireless charging system, when the primary and secondary coils of the contactless transformer cannot be perfectly aligned, that is, when there is a certain misalignment between them, it will also affect the transmission efficiency of the system. For a different size of the misalignment, the contactless transformer also needs to use a different parameter setting.

Therefore, in order to improve the power transmission efficiency of the contactless transformer or adaptively optimize the power transmission, it needs to detect the sizes of the air gap and misalignment between the primary and secondary coils.

SUMMARY

To solve the technical problem, the embodiment of the present document is to provide a regulating method and system for a contactless transformer to optimize power transmission.

To solve the abovementioned problem, the embodiment of the present document provides a regulating method for a contactless transformer, applied to a regulating system including a contactless transformer and a detecting device, wherein the contactless transformer comprises a transmitting end having a transmitting coil, a power transmitting end circuit and a transmitting end controller, and a receiving end having a receiving coil, a power receiving end circuit and a receiving end controller, and the method comprises:

using the detecting device to detect power transmission parameter information between the transmitting coil and the receiving coil of the contactless transformer, wherein the power transmission parameter information comprises air gap and/or misalignment information between the transmitting coil and the receiving coil; and the transmitting end controller regulating operating parameters of the power transmitting end circuit based on the power transmission parameter information; and/or, the receiving end controller regulating operating parameters of the power receiving end circuit based on the power transmission parameter information.

Alternatively, the detecting device comprises a signal transmitting end and a signal receiving end, wherein the signal transmitting end is installed at the transmitting end of the contactless transformer, and the signal receiving end is installed at the receiving end of the contactless transformer; or, the signal transmitting end is installed at the receiving end of the contactless transformer, and the signal receiving end is installed at the transmitting end of the contactless transformer;

the method further comprises: the signal receiving end detecting the power transmission parameter information based on signals of transmitted by the signal transmitting end.

Alternatively, when the signal receiving end is installed at the receiving end of the contactless transformer, the signal receiving end transmits the detected power transmission parameter information to the receiving end controller, and then the receiving end controller forwards the power transmission parameter information to the transmitting end controller; or when the signal receiving end is installed at the transmitting end of the contactless transformer, the signal receiving end transmits the detected power transmission parameter information to the transmitting end controller, and then the transmitting end controller forwards the power transmission parameter information to the receiving end controller.

Alternatively, the step of the transmitting end controller regulating operating parameters of the power transmitting end circuit based on the power transmission parameter information comprises:

the transmitting end controller regulating a frequency parameter and/or a phase angle parameter of the power transmitting end circuit based on the power transmission parameter information; and/or the step of the receiving end controller regulating operating parameters of the power receiving end circuit based on the power transmission parameter information comprises:

the receiving end controller regulating a frequency parameter and/or a phase angle parameter of the power receiving end circuit based on the power transmission parameter information.

Alternatively, the power transmission parameter information is power transmission parameter information between the transmission coil and the receiving coil of the contactless transformer when the contactless transformer is in an operating state.

The embodiment of the present document further provides a regulating system for a contactless transformer, including a contactless transformer, wherein the contactless transformer comprises a transmitting end having a transmitter coil, a power transmitting end circuit and a transmitting end controller, and a receiving end having a receiving coil, a power receiving end circuit and a receiving end controller, characterized in that, the regulating system further comprises a detecting device, wherein:

the detecting device is configured to: detect power transmission parameter information between the transmitting coil and the receiving coil of the contactless transformer, wherein the power transmission parameter information comprises air gap and/or misalignment information between the transmitting coil and the receiving coil;

the transmitting end controller is configured to: regulate operating parameters of the power transmitting end circuit based on the power transmission parameter information; and the receiving end controller is configured to: regulate operating parameters of the power receiving end circuit based on the power transmission parameter information.

Alternatively, the detecting device comprises a signal transmitting end and a signal receiving end, the signal transmitting end is installed at the transmitting end of the contactless transformer, the signal receiving end is installed at the receiving end of the contactless transformer, or the signal transmitting end is installed at the receiving end of the contactless transformer, the signal receiving end is installed at the transmitting end of the contactless transformer; and the signal receiving end is configured to: detect the power transmission parameter information based on signals transmitted by the signal transmitting end.

Alternatively, the signal receiving end is further configured to:

when the signal receiving end is installed at the receiving end of the contactless transformer, transmit the detected power transmission parameter information to the receiving end controller which then forwards the power transmission parameter information to the transmitting end controller; or when the signal receiving end is installed at the transmitting end of the contactless transformer, transmit the detected power transmission parameter information to the transmitting end controller which then forwards the power transmission parameter information to the receiving end controller.

Alternatively, the transmitting end controller is configured to regulate operating parameters of the power transmitting end circuit based on the power transmission parameter information in the following manner: regulating a frequency parameter and/or a phase angle parameter of the power transmitting end circuit based on the power transmission parameter information; and the receiving end controller is configured to regulate the operating parameters of the power receiving end circuit based on the power transmission parameter information in the following manner: regulating a frequency parameter and/or a phase angle parameter of the power receiving end circuit based on the power transmission parameter information.

Alternatively, the power transmission parameter information is power transmission parameter information between the transmitting coil and the receiving coil of the contactless transformer when the contactless transformer is in an operating state.

The abovementioned solution regulates the setting of operating parameters of a power circuit based on an air gap parameter and a misalignment parameter detected when the contactless transformer is in the operating state, so as to control the system to work in the preferred range of parameters, and effectively improve the transmission efficiency.

PREFERRED EMBODIMENTS OF THE INVENTION

Hereinafter, in conjunction with the accompanying drawings, the embodiments of the present document will be described in detail. It should be noted that, in the case of no conflict, embodiments and features in the embodiments of the present application may be arbitrarily combined with each other.

The First Embodiment

Figure 1:
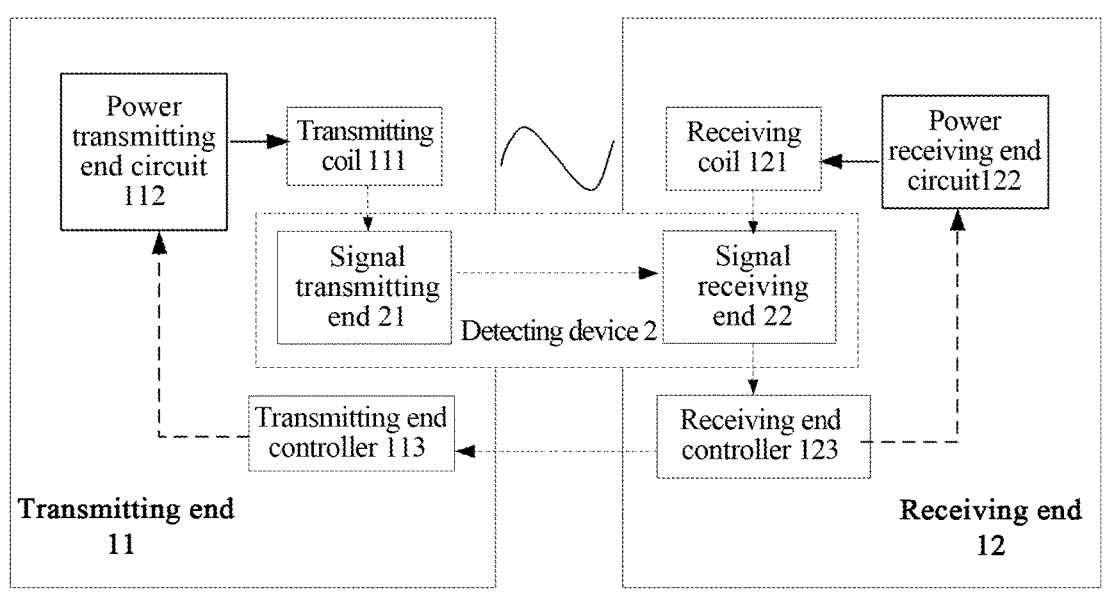
FIG. 1 is a schematic diagram of the structure of a regulating system in accordance with an embodiment of the present document.

The present embodiment provides a regulating method for a contactless transformer, applied to a regulating system including a contactless transformer and detecting device 2. As illustrated in FIG. 1, the regulating system of the present embodiment comprises:

a contactless transformer: including a transmitting end 11 and a receiving end 12, wherein the transmitting end 11 comprises a transmitting coil 111, a power transmitting end circuit 112 and a transmitting end controller 113, the receiving end 12 comprises a receiving coil 121, a power receiving end circuit 122 and a receiving end controller 123; wherein the transmitting end controller 113 is used for regulating operating parameters such as the frequency parameter and/or the phase angle parameter of the power transmitting end circuit 112 based on the power transmission parameter information, the receiving end controller 123 is used for regulating operating parameters such as the frequency parameter and/or the phase angle parameter of the power receiving end circuit 122 based on the power transmission parameter information.

detecting device 2: comprising a signal transmitting end 21 and a signal receiving end 22, wherein the signal transmitting end 21 is installed at the transmitting end 11 or the receiving end 12 of the contactless transformer, the signal receiving end 22 is installed at the other end of the contactless transformer. The signal receiving end 22 detects the power transmission parameter information between the transmitting end 111 and the receiving end 121 of the contactless transformer based on the signals transmitted by the signal transmitting end 11. The signal receiving end 22 transmits the detected power transmission parameter information to the receiving end controller 123, and then the receiving end controller 123 forwards the power transmission parameter information to the transmitting end controller 113. Wherein, the power transmission parameter information comprises air gap and/or misalignment information between the transmitting coil 111 and the receiving coil 121.

As shown in FIG. 1, the signal transmitting end of the detecting device is installed at the transmitting end of the contactless transformer, and the signal receiving end is installed at the receiving end of the contactless transformer.

Figure 2:
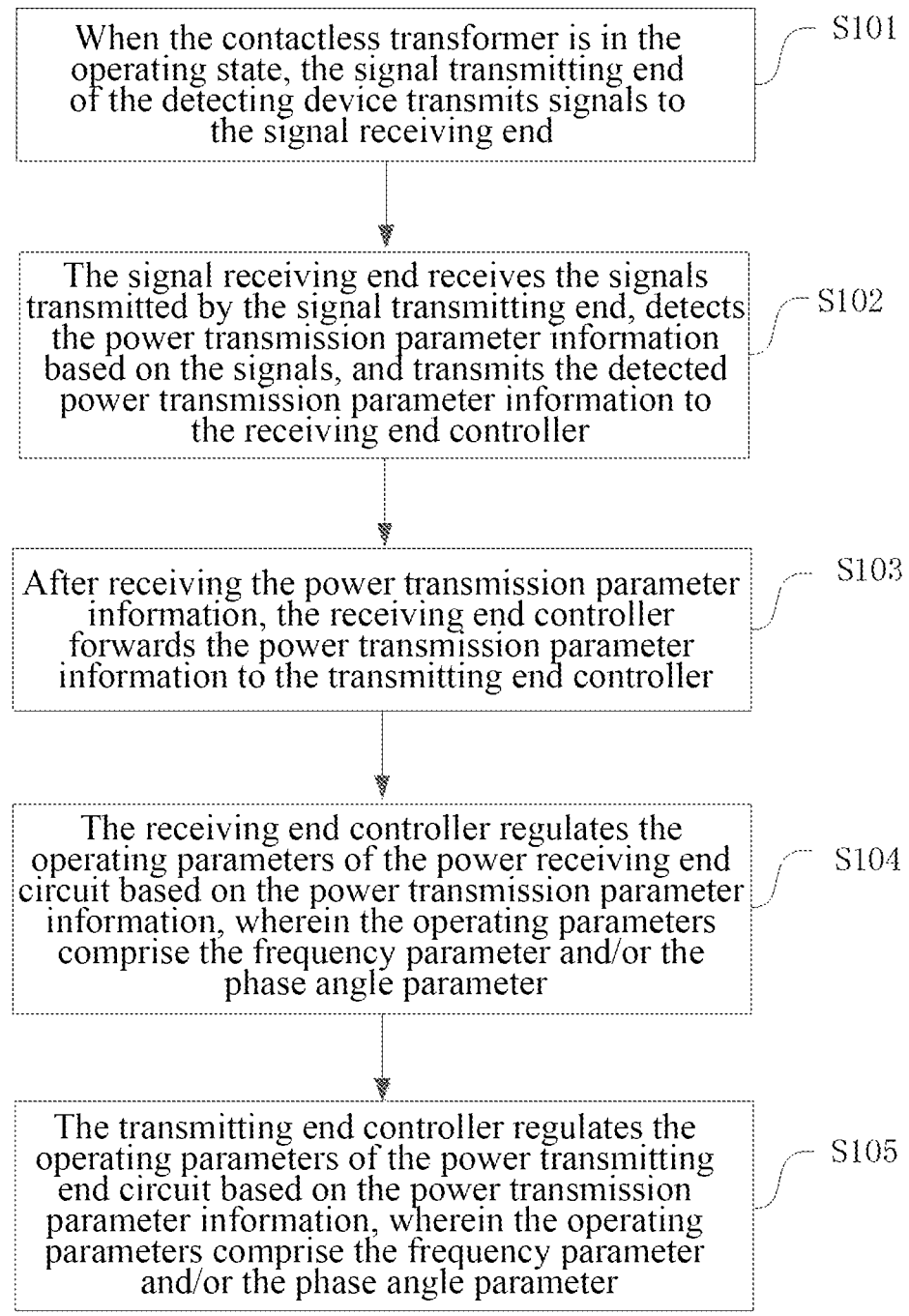
FIG. 2 is a flow chart of a regulating method in accordance with the first embodiment of the present document.

As shown in FIG. 2, the regulating method for a contactless transformer according to the present embodiment comprises:

in step S101, when the contactless transformer is in the operating state, the signal transmitting end of the detecting device transmits signals to the signal receiving end;

the signal transmitting end transmits signals to the signal receiving end via infrared or electromagnetic wave.

In S102, the signal receiving end receives the signals transmitted by the signal transmitting end, detects the power transmission parameter information based on the signals, and transmits the detected power transmission parameter information to the receiving end controller;

the power transmission parameter information is the power transmission parameter information between the transmitting coil and the receiving coil detected when the contactless transformer is in the operating state. However, in other embodiments, it may also be detected in the non-operating state.

Figure 3:
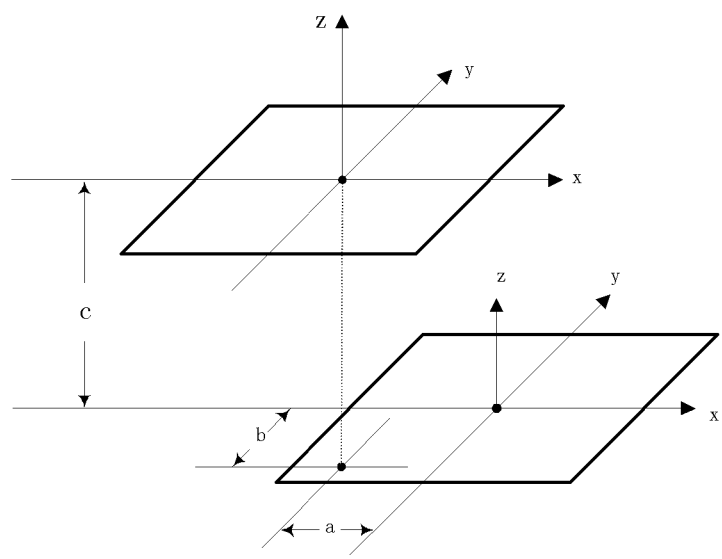
FIG. 3 is a schematic diagram of air gap and misalignment information in accordance with the first embodiment of the present document.

The power transmission parameter information comprises air gap and/or misalignment information between the transmitting coil and the receiving coil. The air gap parameter may be the size of the air gap of the contactless transformer, as c shown in FIG. 3. The misalignment information comprises the axial misalignment size and amplitude misalignment size, as a, b shown in FIG. 3.

In step S103, after receiving the power transmission parameter information, the receiving end controller forwards the power transmission parameter information to the transmitting end controller;

in step S104, the receiving end controller regulates the operating parameters of the power receiving end circuit based on the power transmission parameter information, wherein the operating parameters comprise the frequency parameter and/or the phase angle parameter.

In step S105, the transmitting end controller regulates the operating parameters of the power transmitting end circuit based on the power transmission parameter information, wherein the operating parameters comprise the frequency parameter and/or the phase angle parameter.

It should be noted that, the orders of the steps S103, S104 and S105 in the abovementioned regulating method may be different.

The Second Embodiment

In the present embodiment, the signal transmitting end of the detecting device is installed at the receiving end of the contactless transformer, and the signal receiving end is installed at the transmitting end of the contactless transformer.

Figure 4:
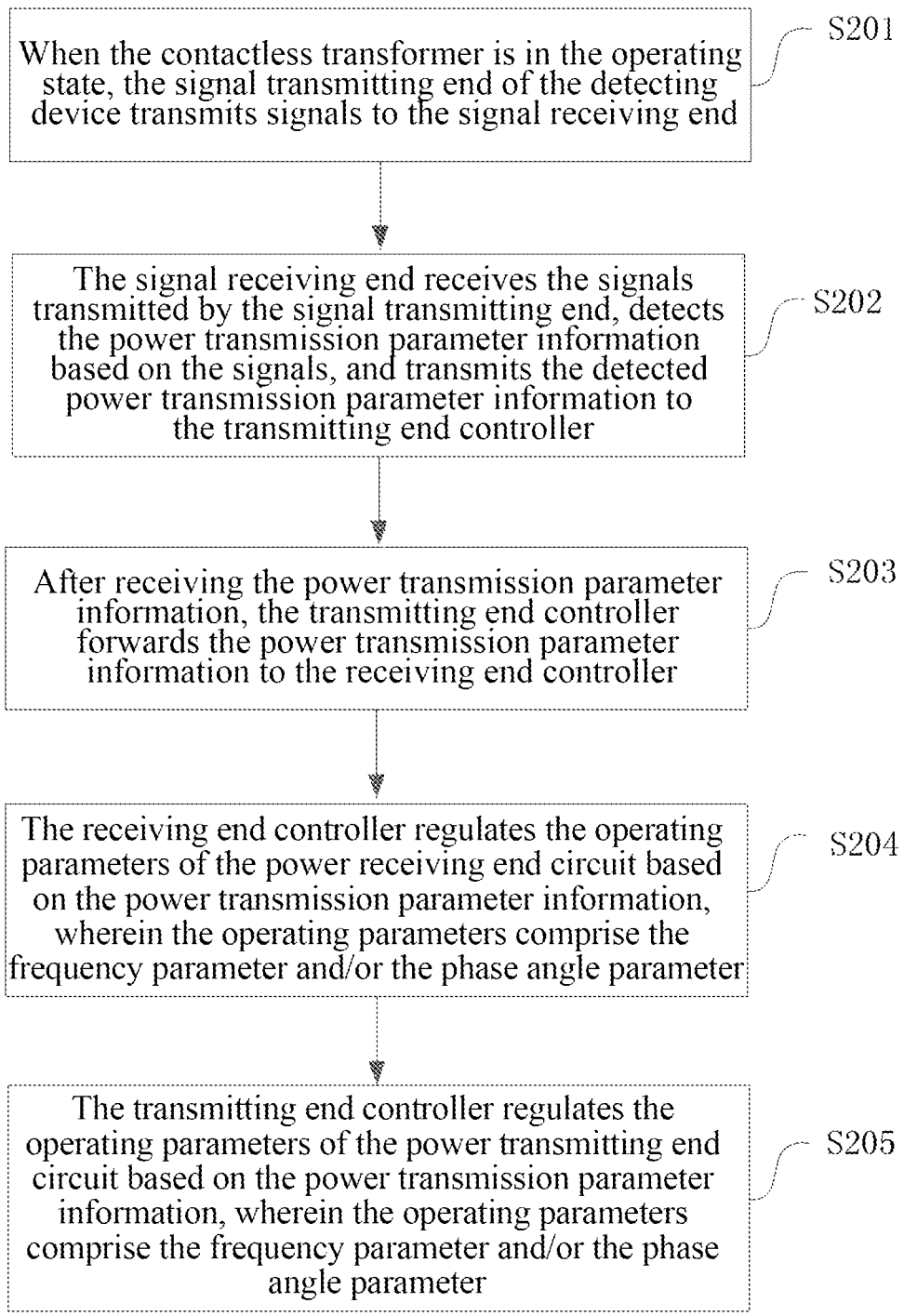
FIG. 4 is a flow chart of a regulating method in accordance with a second embodiment of the present document.

As shown in FIG. 4, the regulating method for a contactless transformer in the second embodiment comprises:

in step S201, when the contactless transformer is in the operating state, the signal transmitting end of the detecting device transmits signals to the signal receiving end;

in step S202, the signal receiving end receives the signals transmitted by the signal transmitting end, detects the power transmission parameter information based on the signals, and transmits the detected power transmission parameter information to the transmitting end controller;

wherein, the power transmission parameter information is the power transmission parameter information between the transmitting coil and the receiving coil when the contactless transformer is in the operating state, and the power transmission parameter information comprises air gap and/or misalignment information between the transmitting coil and the receiving coil.

In step S203, after receiving the power transmission parameter information, the transmitting end controller forwards the power transmission parameter information to the receiving end controller;

in step S204, the receiving end controller regulates the operating parameters of the power receiving end circuit based on the power transmission parameter information, wherein the operating parameters comprise the frequency parameter and/or the phase angle parameter;

in step S205, the transmitting end controller regulates the operating parameters of the power transmitting end circuit based on the power transmission parameter information, wherein the operating parameters comprise the frequency parameter and/or the phase angle parameter.

Similarly, the orders of the steps S203, S204 and S205 in the abovementioned regulating method may be different.

Figure 5:
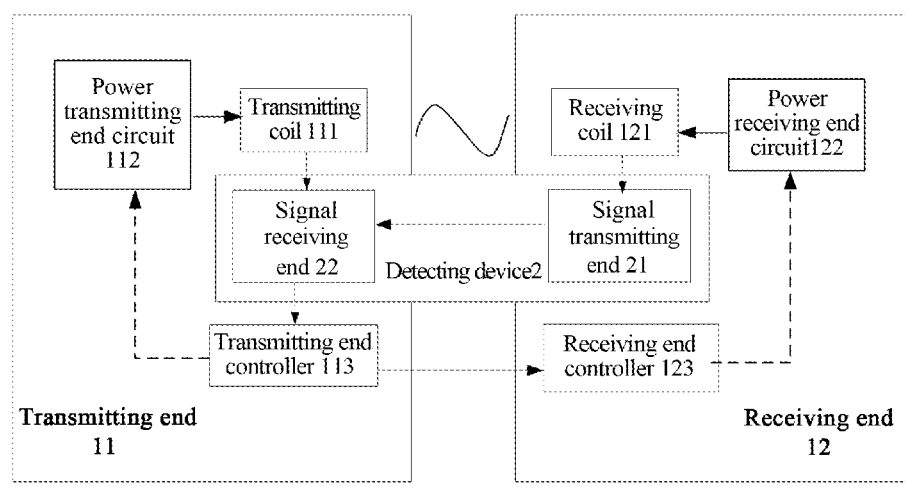
FIG. 5 is a schematic diagram of the structure of a regulating system in accordance with the second embodiment of the present document.

Accordingly, as shown in FIG. 5, the second embodiment provides a regulating system for a contactless transformer, including a contactless transformer and detecting device 2, wherein the contactless transformer comprises a transmitting end 11 and a receiving end 12, the transmitting end 11 comprises a transmitting coil 111, a power transmitting end circuit 112 and a transmitting end controller 113, and the receiving end 12 comprises a receiving coil 121, a power receiving end circuit 122 and a receiving end controller 123.

Alternatively, the detecting device 2 provided in the second embodiment comprises:

A signal transmitting end 21: the signal transmitting end 21 is installed at the receiving end 12 of the contactless transformer, A signal receiving end 22: the signal receiving end 22 is installed at the transmitting end 11 of the contactless transformer.

The signal receiving end 22 detects the power transmission parameter information based on the signals transmitted by the signal transmitting end 21, the signal receiving end 22 transmits the detected power transmission parameter information to the transmitting end controller 113, and then the transmitting end controller 113 forwards the power transmission parameter information to the receiving end controller 123.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The above description is only preferred embodiments of the present document and is not intended to limit the present document, for those ordinarily skilled in the art, the present document may have various modifications and changes. Any modifications, equivalent replacements and improvements made within the spirit and principle of the present document, should be included within the protection scope of the present document.

INDUSTRIAL APPLICABILITY

The abovementioned solution regulates the setting of operating parameters of a power circuit based on an air gap parameter and a misalignment parameter detected when the contactless transformer is in the operating state, so as to control the system to work in the preferred range of parameters, and effectively improve the transmission efficiency. Therefore, it has relatively strong industrial applicability.

What is claimed is:

1. A regulating method for a contactless transformer, applied to a regulating system including a contactless transformer and a detecting device, wherein the contactless transformer comprises a transmitting end having a transmitting coil, a power transmitting end circuit and a transmitting end controller, and a receiving end having a receiving coil, a power receiving end circuit and a receiving end controller, and the method comprises:

the detecting device detecting power transmission parameter information between the transmitting coil and the receiving coil of the contactless transformer, wherein the power transmission parameter information comprises air gap information and misalignment information between the transmitting coil and the receiving coil; wherein the air gap information between the transmitting coil and the receiving coil is a size of the air gap between the transmitting coil and the receiving coil; and wherein the misalignment information between the transmitting coil and the receiving coil comprises an axial misalignment size and an amplitude misalignment size between the transmitting coil and the receiving coil; and the transmitting end controller regulating operating parameters of the power transmitting end circuit based on the air gap information and misalignment information between the transmitting coil and the receiving coil; and the receiving end controller regulating operating parameters of the power receiving end circuit based on the air gap information and the misalignment information between the transmitting coil and the receiving coil.

2. The regulating method of claim 1, wherein, the detecting device comprises a signal transmitting end and a signal receiving end, wherein the signal transmitting end is installed at the transmitting end of the contactless transformer, and the signal receiving end is installed at the receiving end of the contactless transformer; or, the signal transmitting end is installed at the receiving end of the contactless transformer, and the signal receiving end is installed at the transmitting end of the contactless transformer;

the method further comprises: the signal receiving end detecting the power transmission parameter information based on signals of transmitted by the signal transmitting end.

3. The regulating method of claim 2, wherein, the method further comprises, when the signal receiving end is installed at the receiving end of the contactless transformer, the signal receiving end transmitting the detected power transmission parameter information to the receiving end controller, and then the receiving end controller forwarding the power transmission parameter information to the transmitting end controller; or when the signal receiving end is installed at the transmitting end of the contactless transformer, the signal receiving end transmitting the detected power transmission parameter information to the transmitting end controller, and then the transmitting end controller forwarding the power transmission parameter information to the receiving end controller.

4. The regulating method of claim 1, wherein, the step of the transmitting end controller regulating operating parameters of the power transmitting end circuit based on the air gap information and the misalignment information between the transmitting coil and the receiving coil comprises:

the transmitting end controller regulating a frequency parameter and/or a phase angle parameter of the power transmitting end circuit based on the air gap information and the misalignment information between the transmitting coil and the receiving coil; and/or the step of the receiving end controller regulating operating parameters of the power receiving end circuit based on the air gap information and the misalignment information between the transmitting coil and the receiving coil comprises:

the receiving end controller regulating a frequency parameter and/or a phase angle parameter of the power receiving end circuit based on the air gap information and the misalignment information between the transmitting coil and the receiving coil.

5. The regulating method of claim 1, wherein, the power transmission parameter information is power transmission parameter information between the transmission coil and the receiving coil of the contactless transformer when the contactless transformer is in an operating state.

6. A regulating system for a contactless transformer, comprising: a contactless transformer, wherein the contactless transformer comprises a transmitting end having a transmitter coil, a power transmitting end circuit and a transmitting end controller, and a receiving end having a receiving coil, a power receiving end circuit and a receiving end controller, the regulating system further comprises a detecting device, wherein:

the detecting device is configured to: detect power transmission parameter information between the transmitting coil and the receiving coil of the contactless transformer, wherein the power transmission parameter information comprises air gap information and misalignment information between the transmitting coil and the receiving coil; wherein the air gap information between the transmitting coil and the receiving coil is a size of the air gap between the transmitting coil and the receiving coil; and wherein the misalignment information between the transmitting coil and the receiving coil comprises an axial misalignment size and an amplitude misalignment size between the transmitting coil and the receiving coil;

the transmitting end controller is configured to: regulate operating parameters of the power transmitting end circuit based on the air gap information and the misalignment information between the transmitting coil and the receiving coil; and the receiving end controller is configured to: regulate operating parameters of the power receiving end circuit based on the air gap information and the misalignment information between the transmitting coil and the receiving coil.

7. The regulating system of claim 6, wherein, the detecting device comprises a signal transmitting end and a signal receiving end, the signal transmitting end is installed at the transmitting end of the contactless transformer, the signal receiving end is installed at the receiving end of the contactless transformer, or the signal transmitting end is installed at the receiving end of the contactless transformer, the signal receiving end is installed at the transmitting end of the contactless transformer; and the signal receiving end is configured to: detect the power transmission parameter information based on signals transmitted by the signal transmitting end.

8. The regulating system of claim 7, wherein,
the signal receiving end is further configured to:
when the signal receiving end is installed at the receiving end of the contactless transformer, transmit the detected power transmission parameter information to the receiving end controller which then forwards the power transmission parameter information to the transmitting end controller; or
when the signal receiving end is installed at the transmitting end of the contactless transformer, transmit the detected power transmission parameter information to the transmitting end controller which then forwards the power transmission parameter information to the receiving end controller.

9. The regulating system of claim 6, wherein,
the transmitting end controller is configured to regulate operating parameters of the power transmitting end circuit based on the air gap information and the misalignment information between the transmitting coil and the receiving coil by means of: regulating a frequency parameter and/or a phase angle parameter of the power transmitting end circuit based on the air gap information and the misalignment information between the transmitting coil and the receiving coil; and/or
the receiving end controller is configured to regulate operating parameters of the power receiving end circuit based on the air gap information and the misalignment information between the transmitting coil and the receiving coil by means of: regulating a frequency parameter and/or a phase angle parameter of the power receiving end circuit based on the air gap information and the misalignment information between the transmitting coil and the receiving coil.

10. The regulating system of claim 6, wherein,
the power transmission parameter information is power transmission parameter information between the transmitting coil and the receiving coil of the contactless transformer when the contactless transformer is in an operating state.

11. The regulating method of claim 2, wherein,
the step of the transmitting end controller regulating operating parameters of the power transmitting end circuit based on the air gap information and the misalignment information between the transmitting coil and the receiving coil comprises:
the transmitting end controller regulating a frequency parameter and/or a phase angle parameter of the power transmitting end circuit based on the air gap information and the misalignment information between the transmitting coil and the receiving coil; and/or
the step of the receiving end controller regulating operating parameters of the power receiving end circuit based on the air gap information and the misalignment information between the transmitting coil and the receiving coil comprises:
the receiving end controller regulating a frequency parameter and/or a phase angle parameter of the power receiving end circuit based on the air gap information and the misalignment information between the transmitting coil and the receiving coil.

12. The regulating method of claim 3, wherein,
the step of the transmitting end controller regulating operating parameters of the power transmitting end circuit based on the air gap information and the misalignment information between the transmitting coil and the receiving coil comprises:
the transmitting end controller regulating a frequency parameter and/or a phase angle parameter of the power transmitting end circuit based on the air gap information and the misalignment information between the transmitting coil and the receiving coil; and/or
the step of the receiving end controller regulating operating parameters of the power receiving end circuit based on the air gap information and the misalignment information between the transmitting coil and the receiving coil comprises:
the receiving end controller regulating a frequency parameter and/or a phase angle parameter of the power receiving end circuit based on the air gap information and the misalignment information between the transmitting coil and the receiving coil.

13. The regulating method of claim 2, wherein,
the power transmission parameter information is power transmission parameter information between the transmission coil and the receiving coil of the contactless transformer when the contactless transformer is in an operating state.

14. The regulating method of claim 3, wherein,
the power transmission parameter information is power transmission parameter information between the transmission coil and the receiving coil of the contactless transformer when the contactless transformer is in an operating state.

15. The regulating system of claim 7, wherein,
the transmitting end controller is configured to regulate operating parameters of the power transmitting end circuit based on the air gap information and the misalignment information between the transmitting coil and the receiving coil by means of: regulating a frequency parameter and/or a phase angle parameter of the power transmitting end circuit based on the air gap information and the misalignment information between the transmitting coil and the receiving coil; and/or
the receiving end controller is configured to regulate operating parameters of the power receiving end circuit based on the air gap information and the misalignment information between the transmitting coil and the receiving coil by means of: regulating a frequency parameter and/or a phase angle parameter of the power receiving end circuit based on the air gap information and the misalignment information between the transmitting coil and the receiving coil.

16. The regulating system of claim 8, wherein,
the transmitting end controller is configured to regulate operating parameters of the power transmitting end circuit based on the air gap information and the misalignment information between the transmitting coil and the receiving coil by means of: regulating a frequency parameter and/or a phase angle parameter of the power transmitting end circuit based on the air gap information and the misalignment information between the transmitting coil and the receiving coil; and/or
the receiving end controller is configured to regulate operating parameters of the power receiving end circuit based on the air gap information and the misalignment information between the transmitting coil and the receiving coil by means of: regulating a frequency parameter and/or a phase angle parameter of the power receiving end circuit based on the air gap information and the misalignment information between the transmitting coil and the receiving coil.

17. The regulating system of claim 7, wherein,
the power transmission parameter information is power transmission parameter information between the transmitting coil and the receiving coil of the contactless transformer when the contactless transformer is in an operating state.

18. The regulating system of claim 8, wherein,
the power transmission parameter information is power transmission parameter information between the transmitting coil and the receiving coil of the contactless transformer when the contactless transformer is in an operating state.

* * * * *